United States Patent
Eck

(10) Patent No.: US 8,827,603 B2
(45) Date of Patent: Sep. 9, 2014

(54) FITTING REMOVAL APPARATUS AND METHOD OF USING SAME

(76) Inventor: Dennis W. Eck, Edmond, OK (US)

( * ) Notice: Subject to any disclaimer, the term of this patent is extended or adjusted under 35 U.S.C. 154(b) by 1215 days.

(21) Appl. No.: 12/704,254

(22) Filed: Feb. 11, 2010

(65) Prior Publication Data

US 2010/0284754 A1 Nov. 11, 2010

Related U.S. Application Data

(60) Provisional application No. 61/215,584, filed on May 7, 2009.

(51) Int. Cl.
*B23B 47/28* (2006.01)
*B23B 51/04* (2006.01)

(52) U.S. Cl.
CPC .......... *B23B 51/0426* (2013.01); *B23B 47/281* (2013.01)
USPC .................. 408/80; 408/79; 408/81; 408/94; 408/115 R; 408/1 R

(58) Field of Classification Search
USPC ....... 408/94, 204, 115 R, 79, 80, 81, 201, 1 R
See application file for complete search history.

(56) References Cited

U.S. PATENT DOCUMENTS

| 2,725,766 | A | * | 12/1955 | Van Heukelom | 408/81 |
| 2,808,599 | A | * | 10/1957 | Kerr et al. | 408/80 |
| 4,493,344 | A | | 1/1985 | Mathison et al. | |
| 5,304,018 | A | | 4/1994 | LaVanchy et al. | |
| 5,366,326 | A | * | 11/1994 | Converse | 408/72 B |
| 5,820,314 | A | * | 10/1998 | Dunbar | 408/72 B |
| 6,409,437 | B1 | * | 6/2002 | Metzger | 408/80 |
| 6,929,430 | B2 | * | 8/2005 | Dever | 408/80 |
| 7,513,718 | B1 | * | 4/2009 | Arnold | 408/1 R |

* cited by examiner

*Primary Examiner* — Andrea Wellington
*Assistant Examiner* — Mohammad Nourbakhsh
(74) *Attorney, Agent, or Firm* — Dunlap Codding, P.C.

(57) ABSTRACT

An apparatus and method for removing a fitting from a pipe having a central axis. The apparatus includes a guide member which defines a guide passage and a means for supporting the guide member within at least a portion of the pipe with the longitudinal axis of the guide passage in a coaxial relationship with the central axis of the pipe. The apparatus also includes a rotary hole saw having a cylindrical wall provided with a plurality of cutting teeth on an open end thereof and a central axis of rotation. The cylindrical wall defines a cylindrical chamber. A guide rod is connected to the rotary hole saw such that the guide rod extends through the cylindrical chamber of the hole saw and beyond the open end thereof in coaxial alignment with the central axis of rotation. The guide rod is slidingly receivable in the guide passage of the guide member.

1 Claim, 5 Drawing Sheets

FITTING REMOVAL APPARATUS AND METHOD OF USING SAME

CROSS-REFERENCE TO RELATED APPLICATIONS

This application claims priority to U.S. Provisional application No. 61/215,584, filed May 7, 2009, the entire contents of which are herein incorporated by reference.

BACKGROUND OF THE INVENTION

1. Field of the Invention

This invention relates generally to a cutting apparatus. More particularly, but not by way of limitation, the present invention relates to a method and apparatus for removing a fitting from a pipe.

2. Brief Description of the Related Art

A number of prior art devices have been suggested for removing a fitting from a pipe. However, these devices suffer from a number of limitations and deficiencies. One such device is disclosed in U.S. Pat. No. 6,929,430, issued to Dever. Dever discloses a water closet flange removal tool that includes an axial shaft, a cylindrical guide body attached to a lower end of the shaft, and a cylindrical wall cutter mounted above the guide body and on the axial shaft. The Dever tool uses a single component wherein the cylindrical guide body is intended to guide the cylindrical wall cutter along the interior surface of the pipe to thereby position the cylindrical wall cutter along the outside of the pipe to remove the fitting.

However, the Dever tool suffers from a number of problems with the design and operation thereof. For example, the diameter of the cylindrical guide body is fixed such that it can only be used with a pipe having a specific diameter. The cylindrical guide body cannot be adjusted to fit properly in a number of different pipes having different diameters. Using the Dever tool to remove a fitting from a pipe having an inside diameter that varies because of, for example, differences in manufacturing tolerances, wear and tear associated with normal use, or the like, would limit the accuracy or reliability of the Dever tool. For example, if the Dever tool were to be used to remove the fitting from a pipe wherein the interior dimension of the pipe had been expanded through normal wear and tear and differing manufacturing tolerances, the cylindrical guide body would not form a secure fit within the interior pipe wall and there may be sufficient room within the pipe for the cylindrical guide body to move laterally with respect to the central axis of the pipe. As would be understood, in this situation, the excess movement of the cylindrical guide body within the interior of the pipe would result in the cylindrical wall cutter being misaligned with the central axis of the pipe. In such a case, the cylindrical wall cutter would likely contact the pipe, thereby destroying or otherwise damaging the pipe.

In addition, the Dever tool could not be used with a pipe that has an interior dimension smaller than specified due to, for example, different manufacturing tolerances and/or obstructions within the pipe. In such a situation where the interior dimension of the pipe is less than that of the outer dimension of the cylindrical guide body, Devers cylindrical guide body would be too large to be inserted into the pipe and thereby could not be used at all.

Another limitation of the Dever tool is the cylindrical guide body and cylindrical wall cutter being axially attached to a single rod. As would be understood in the art, an individual using the Dever tool with, for example, a drill, wherein the individual did not maintain substantially perfect alignment of the rod axis with the central axis of the pipe could thereby twist and alter the angle where the cylindrical wall cutter contacts the pipe and/or the fitting. In this instance, the cylindrical wall cutter could likely contact the pipe in addition to the fitting, thereby causing damage to the pipe. That is, an individual using the Dever tool would be required to maintain almost perfect alignment throughout the operation of the system to prevent damage to the pipe. In the instant described above wherein the interior dimension of the pipe was enlarged such that the cylindrical guide body did not maintain a consistent fit, the individual using the Dever tool could more likely misalign the single rod with the central axis of the pipe and thereby damage or destroy the pipe.

Yet another limitation of the Dever tool is presented wherein the interior of the pipe is blocked or configured such that the cylindrical guide body could not be extended downward therein for the length necessary for the cylindrical wall cutter to remove the exterior fitting. That is, because the Dever tool relies on the cylindrical wall cutter and the cylindrical guide body to be fixed on the axial rod, in an instance where the interior of the pipe is obstructed or is configured, for example, with an elbow positioned near the entrance to the pipe, the user would not be able to extend the cylindrical guide body into the pipe a sufficient length for the cylindrical wall cutter to remove the fitting.

Thus, the Dever system suffers from a number of limitations wherein it could not be used for certain configurations of a pipe and/or it could not be used in a situation in which the interior dimension of the pipe was larger than the exterior diameter of the cylindrical guide body.

To this end, a need exists for an improved apparatus and method for removing a fitting from a pipe with minimal or no damage to the pipe. It is to such an apparatus and method that the present invention is directed.

DETAILED DESCRIPTION OF EXEMPLARY EMBODIMENTS

Figure 1:
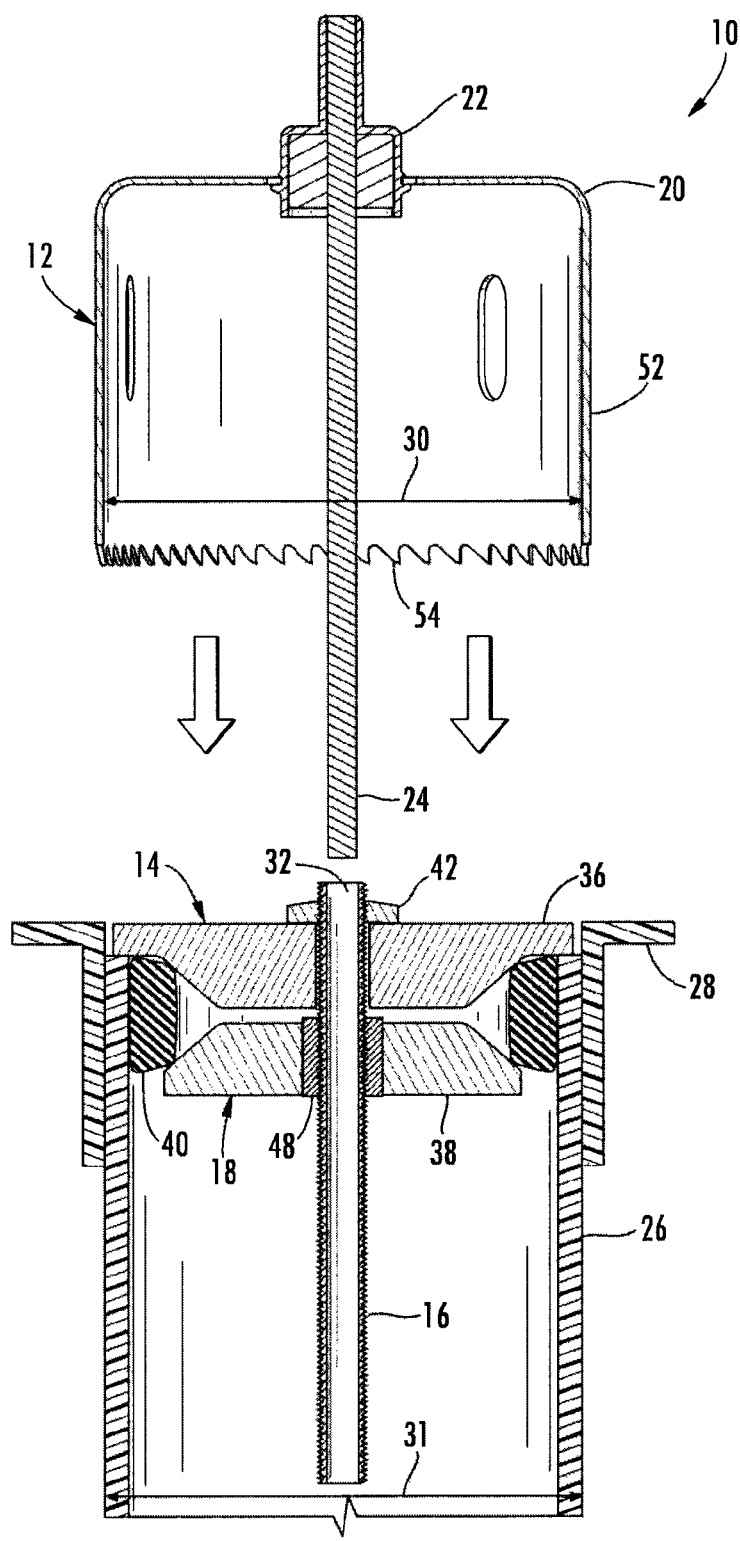
FIG. 1 is a sectional view of a fitting removal apparatus with a guide assembly positioned inside a pipe and a cutter assembly shown in a pre-cutting position.
Figure 2:
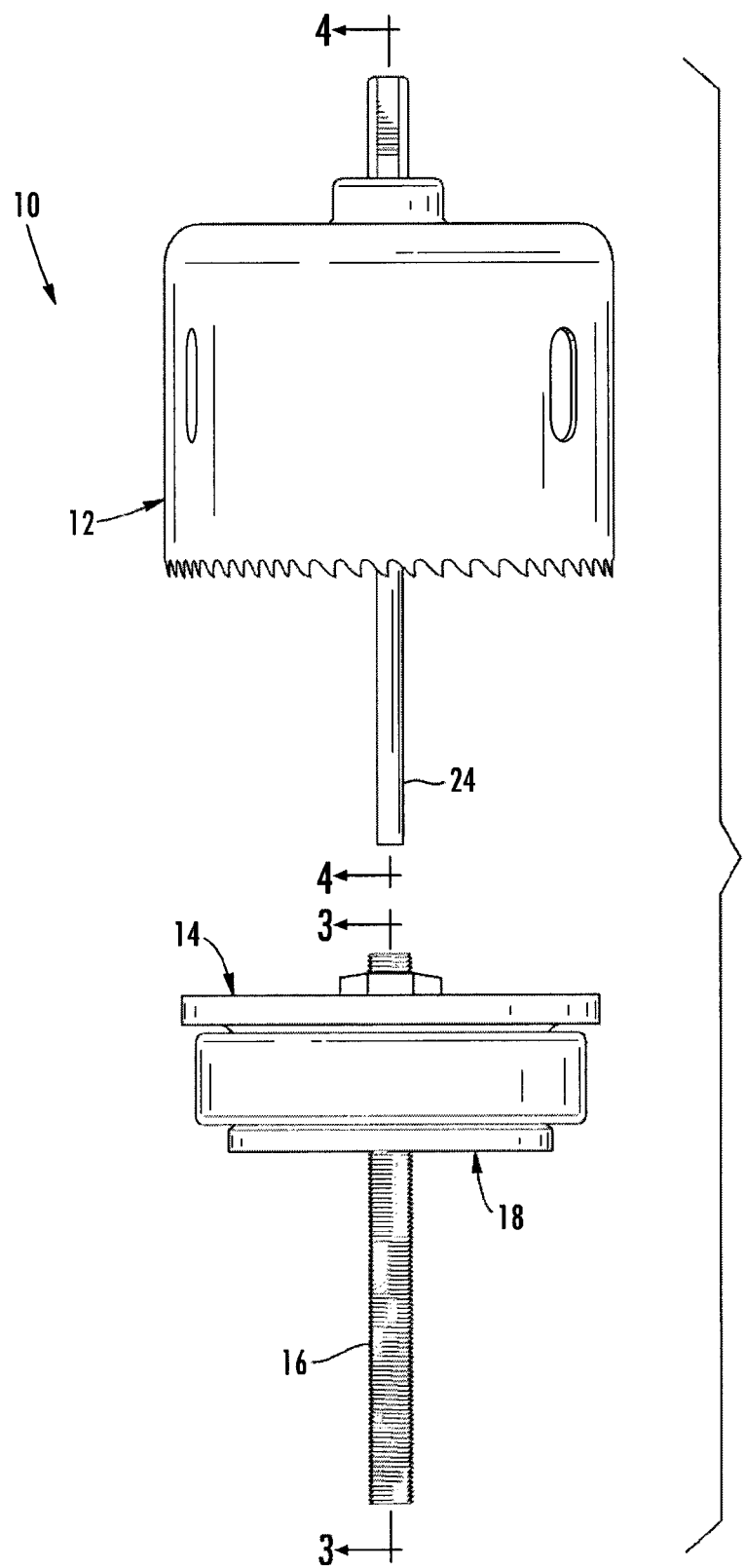
FIG. 2 is an elevational view of the fitting removal apparatus of the present invention.

Referring now to the drawings, and in particular to FIGS. 1-2, shown therein and designated by reference, numeral 10 is a fitting removal apparatus 10 constructed in accordance with the present invention. Broadly, the apparatus 10 includes a cutter assembly 12 and a guide assembly 14. The guide assembly 14 includes a guide member 16 and a support assembly 18 for supporting the guide member 16. The cutter assembly 12 includes a rotary hole saw 20, a mandrel 22, and a guide rod 24.

In FIG. 1, the apparatus 10 is shown with the guide assembly 14 positioned inside a pipe 26 having a fitting 28 attached thereto. The cutter assembly 12 is shown in a pre-cutting position. In general, the guide member 16 is secured inside the pipe 26 via the support assembly 18 such that the guide member 16 is securely positioned in a coaxial relationship with a central axis of the pipe 26. The guide rod 24 of the cutter assembly 12 is then partially inserted into the guide member 16 wherein a rotational force is then applied to the cutter assembly 12 via, for example, a drill (not shown). The guide rod 24 is then further inserted into the guide member 16 such that the cutter assembly 12 is thereby lowered onto the pipe 26 having the fitting 28 attached thereto. The guide member 16 being securely positioned in coaxial relationship with the pipe 26 maintains substantial alignment of the central axis of the pipe 26 with the central axis of the guide rod 24 of the cutter assembly 12. Thus, the central axis of cutter assembly 12 is substantially aligned with the central axis of the pipe 26, via the guide member 16 and the support assembly 18, permitting the cutter assembly 12 to be lowered about the pipe 26 in an aligned manner. Further, the rotary hole saw 20 is sized to have an interior diameter 30 which substantially corresponds to an outer diameter 31 of the pipe 26. Therefore, when the cutter assembly 12 is lowered about the pipe 26, rotary hole saw 20 thereby removes the fitting 28 without contacting or otherwise damaging the pipe 26. Once the apparatus 10 has been used to remove the fitting 28 from the pipe 26, the guide assembly 14 can then be removed and the pipe 26 can then be reused, or a new fitting can be attached thereto without requiring replacement or repair of the pipe 26.

Figure 3:
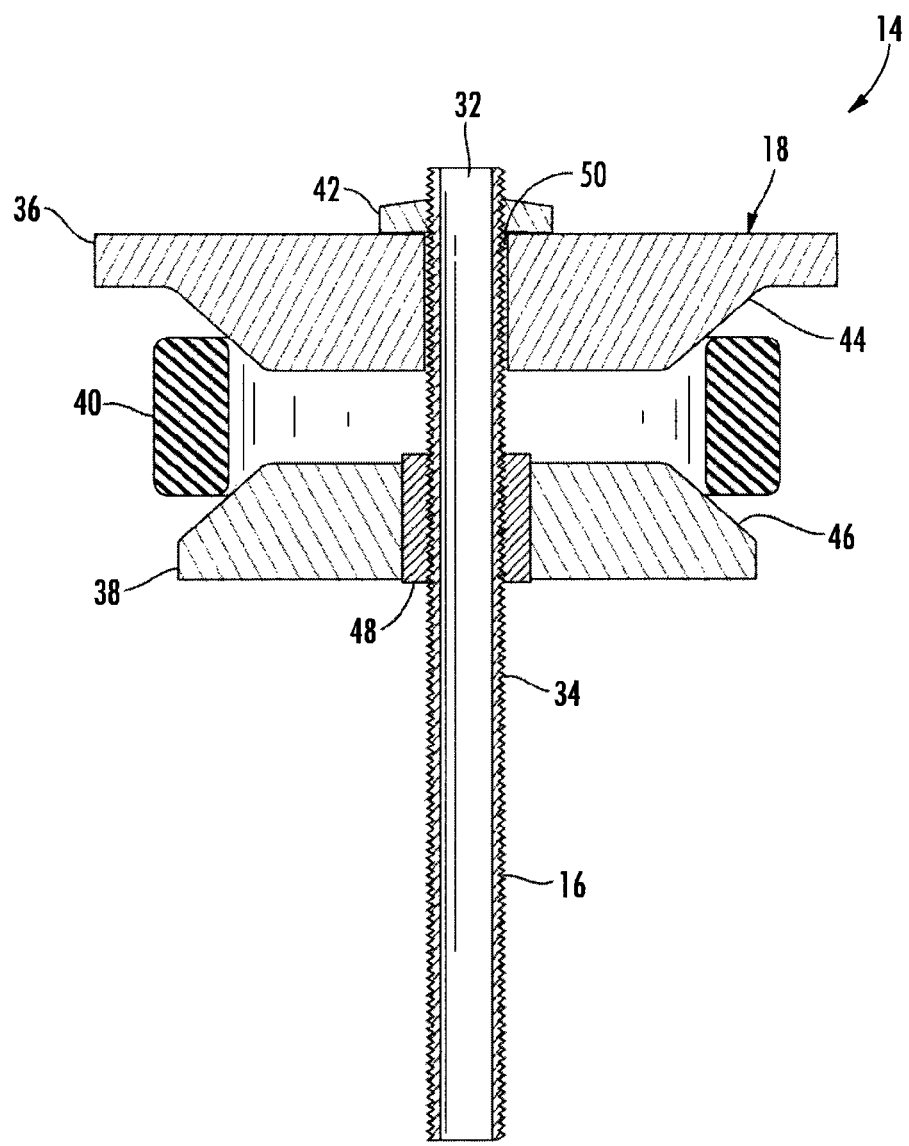
FIG. 3 is a sectional view taken along line 3-3 of FIG. 2.

Referring now to FIG. 3, shown therein in more detail is a sectional view of a preferred embodiment of the guide assembly 14 constructed in accordance with the present invention. The guide assembly 14 includes the guide member 16 and the support assembly 18 discussed above. The guide member 16 is embodied as a circular tube or pipe having an axial opening therein so as to define a guide passage 32 having a central axis. The guide member 16 can be constructed of a rigid material such as, for example, steel, iron, or the like. The guide passage 32 slidingly receives the guide rod 24 of the cutter assembly 12. Further, as will be described in more detail below, the guide member 16 includes a plurality of threads 34 extending along at least a portion of the exterior surface which permit the guide member 16 to be secured to, and adjusted relative to the support assembly 18.

The support assembly 18 includes a top member 36, a bottom member 38, and an expandable gripping member 40. The support assembly 18 secures the guide member 16 within at least a portion of the pipe 26 such that the central axis of the guide passage 32 is in a coaxial relationship with the central axis of the pipe 26. The guide member 16 is adjustable by a user of the apparatus 10 to change the outside diameter of the gripping member 40 wherein the guide assembly 14 is thereby securable inside the pipe 26. In particular, the guide assembly 14 is constructed such that, in a relaxed state, the gripping member 40 has a diameter smaller than the diameter when the member 40 is in a compressed state, or otherwise acted upon by the top member 36 and the bottom member 38, and caused to expand.

One such example of a support assembly can be found in U.S. Pat. No. 4,493,344, issued to Mathison, the entire contents of which are herein incorporated by reference. However, other embodiments of a support assembly would become apparent to one having ordinary skill in the art.

The bottom member 38 is affixed to, or otherwise positioned on the guide member 16 such that the bottom member 38 is stationary, i.e., the bottom member 38 is not adjustable or otherwise movable in relation to the guide member 16. The gripping member 40 is positioned on top of the bottom member 38 and the top member 36 is positioned on top of the gripping member 40. The guide assembly 14 further includes a top fastener 42 adapted to adjust the pressure on the top member 36, i.e., apply an axial force to the top member 36 to move the top member 36 towards the bottom member 38. As should be understood, as the top member 36 is moved towards the bottom member 38, the gripping member 40 is compressed which causes the member 40 to expand. As the gripping member 40 expands, its outside diameter increases which then causes it to contact the interior surface of the pipe 26. Increased pressure applied to the gripping member 40 by the top member 36 provides added radial force on the gripping member 40 so as to secure the gripping member 40 against the interior surface of the pipe 26. Thus, the support assembly 18 securely supports the guide member 16 within at least a portion of the pipe 26 while maintaining axial alignment of the central axis of the guide passage 32 with the central axis of the pipe 26.

The top member 36 includes a top angled face 44 and the bottom member 38 includes a bottom angled face 46, which cooperate to act on or otherwise apply pressure to the gripping member 40 thereby compressing the gripping member 40. As the gripping member 40 is compressed, or otherwise acted upon, it is thereby forced outward causing the gripping member 40 to expand in a radial direction. It should be understood that, although shown as angled faces, the top angled face 44 and the bottom angled face 46 can be configured in any number of shapes and/or configurations to thereby perform similar functions without departing from the scope and intent of the present invention. Examples of such alternative configurations include a stepped face, rounded face, and the like.

Referring again to FIG. 3, the bottom member 38 is fastened to or otherwise affixed to the guide member 16 via a bottom fastener 48 which permits adjustment of the bottom member 38 along the axial direction of the guide member 16. For example, as discussed above, the guide member 16 includes a plurality of threads 34 along at least a portion of its exterior length. The bottom member 38 is affixed to the guide member 16 using the bottom fastener 48 wherein the bottom fastener 48 includes a plurality of threads adapted to cooperate with the plurality of threads 34 to thereby secure the bottom member 38 to the guide member 16. As would be understood in the art, when the bottom fastener 48 is affixed to the guide member 16 via the plurality of threads 34, the bottom member 38 would then be stationarily affixed to the guide member 16 when in use, for example, when the guide assembly 14 is affixed inside the pipe 26. However, when not in use, the bottom member 38 may be adjustable along the axial direction of the guide member 16. That is, the bottom member 38 may be rotated around the guide member 16 via the plurality of threads to raise or lower the bottom member 38 along the axial length of the guide member 16. As would be further appreciated in the art, adjustment of the bottom member 38 would be accomplished prior to operational use of the apparatus 10 (i.e., before the guide assembly 14 is inserted into the pipe 26). The bottom member 38 could be adjusted along the axial length of the guide member 16 prior to use wherein the user of the apparatus 10 ensures that the guide assembly 14 is configured to fit within the pipe 26.

The top member 36 is positioned on the guide member 16 to secure the gripping member 40 between the bottom member 38 and the top member 36. The top member 36 includes a central passage 50 for receiving the guide member 16. The top member 36 is secured to the guide member 16 using the top fastener 42. The top fastener 42 can be embodied as a nut or other fastening device known in the art. However, the top fastener 42 can be embodied as other fasteners which achieve similar functionality. For example, the top fastener 42 can be embodied as a wing-nut, a spring loaded tensioning device, a quick release device, and the like. The top fastener 42 can be embodied as a variety of mechanisms which operate on the top member 36 to apply force thereon to move the top member 36 towards bottom member 38 or release force from the top member 36, thereby releasing pressure on the gripping member 40.

Alternatively, the top member 36 may be affixed to the guide member 16 in a manner similar to which the bottom member 38 is affixed to the guide member 16 (i.e., using a fastener similar to the bottom fastener 48). In this embodiment, the top member 36 includes a fastener with a plurality of threads whereby a user can manually rotate the top member 36 along the thread 28 of the guide member 16 to adjust the position of the top member 36 relative to the bottom member 38. For example, the top member 36 can include holes, wings, or other configurations whereby the user of the apparatus 10 can rotate the top member 36 to move the top member 36 towards or away from bottom member 38.

The gripping member 40 can be constructed using any malleable material capable of expanding in a radial direction when a compressive force is applied thereto, and retracting when the force is released. Examples of such materials include rubber or other polymeric materials which are known in the art. The gripping member 40 permits use of the guide assembly 14 in the pipe 26 when the interior dimension of the pipe 26 varies outside of predefined parameters. That is, the gripping member 40 permits use of the apparatus 10 in the pipe 26 when the interior dimension of the pipe 26 varies because of, for example, differences in manufacturing tolerances, normal wear and tear associated with use, and the like. A user of the apparatus 10 can adjust the top member 36 to apply pressure to the gripping member 40 to cause the member 40 to expand radially and conform to the contour of the interior of the pipe 26. Similarly, in the case where the interior dimension of the pipe 26 is smaller than anticipated, the user could manually restrict the gripping member 40 to ensure that the guide assembly 14 is positionable within the pipe 26.

Figure 5:
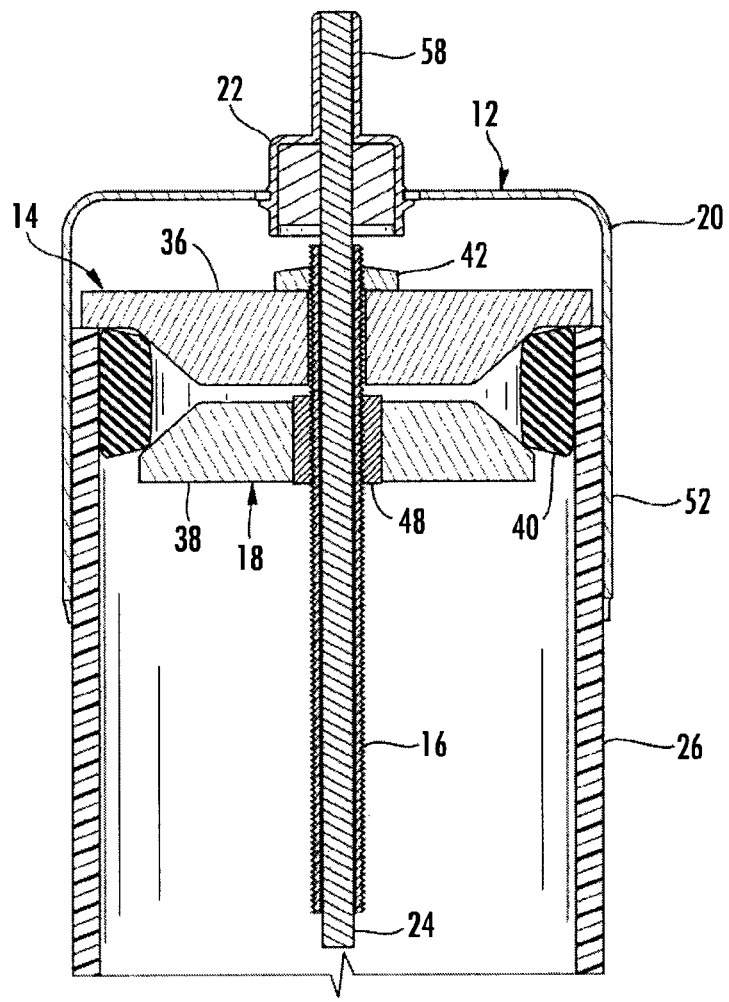
FIG. 5 is a sectional view of the fitting removal apparatus illustrating the cutter assembly having cut through a fitting.

In use, the guide assembly 14 is positioned and secured inside the pipe 26, as shown in FIGS. 1 and 5. Initially, the distance between the top member 36 and the bottom member 38 would be such that little or no pressure is applied to the gripping member 40. That is, the guide assembly 14 is configured such that the outside diameter of the gripping member 40 is at its smallest to allow the guide assembly 14 to be positioned inside the pipe 26. The user then adjusts the top member 36, in the manner described above, along the axial length of guide member 16 (e.g., towards the bottom member 38). As the top member 36 is adjusted towards the bottom member 38, the top member 36 and the bottom member 38 apply pressure to the gripping member 40. As the pressure applied to the gripping member 40 increases, the member 40 expands outwardly (radially) so as to contact the interior walls of the pipe 26 and secure the guide assembly 14 inside the pipe 26.

Figure 4:
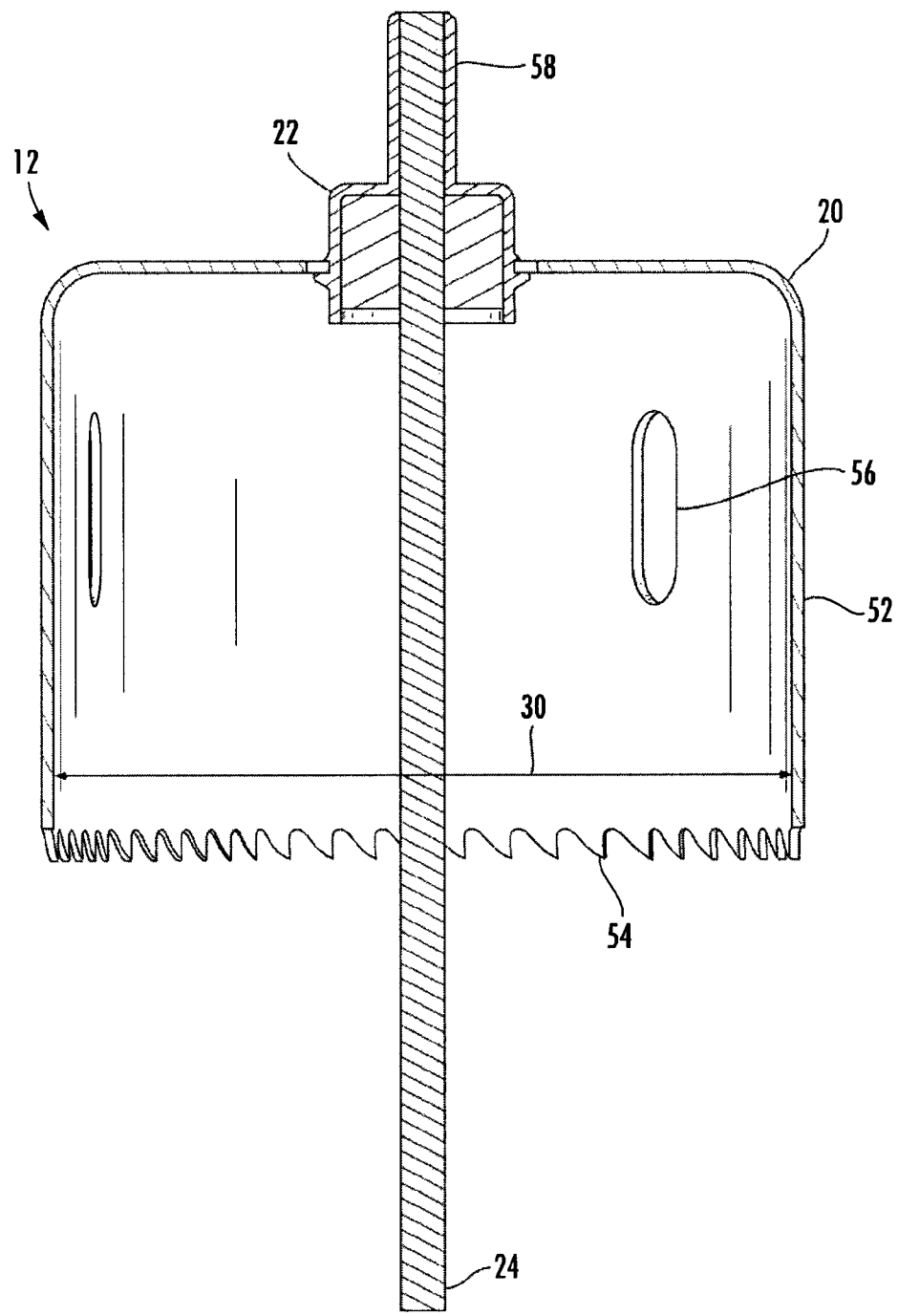
FIG. 4 is a sectional view taken along line 4-4 of FIG. 2.

Referring now to FIG. 4, shown therein is a sectional view of the cutter assembly 12 constructed in accordance with the present invention. The cutter assembly 12 includes the rotary hole saw 20 and the guide rod 24. Guide rod 24 can be embodied as a solid rod constructed using metal, steel, or other rigid material known in the art. The guide rod 24 is sized and shaped to be slidingly and rotatably received in the guide passage 32. The rotary hole saw 20 has a cylindrical wall 52 defining an open end and having a plurality of cutting teeth 54 on the open end. The cylindrical wall 52 can optionally include one or more relief ports 56 which operate to dissipate heat or otherwise reduce the heat of the cutter assembly 12 when in use. Additionally, the relief port 56 can be used to eject or otherwise remove debris generated when the apparatus 10 is in use.

The Cutter assembly 12 further includes the mandrel 22 to which the guide rod 24 is connected. The guide rod 24 can be either permanently affixed to mandrel 22, or can be detachable. The mandrel 22 has a shank 58 for attachment to a rotary device such as a drill.

The rotary hole saw 20 has an interior diameter 30 which substantially corresponds to the outer diameter 31 of the pipe 26 such that the interior diameter 30 is substantially sized so as to remove the fitting 28 without contacting or damaging the outside of the pipe 26.

Referring now to FIGS. 1 and 5, shown therein is the apparatus 10 as it would be used in operation. As shown in FIG. 1, the guide assembly 14 has been secured inside the pipe 26 such that the guide member 16, including the guide passage 32, is securely fixed in a coaxial relationship with the central axis of the pipe 26, and the guide passage 32 of the guide member 16 is substantially parallel to the central axis of the pipe 26. As was discussed above, the guide assembly 14 is secured inside the pipe 26 using, for example, the top fastener 42 to apply a force to the top member 36 so as to apply pressure to the gripping member 40, causing the gripping member 40 to expand and thereby engage the inside wall of the pipe 26. With the guide assembly 14 secured inside the pipe 26, the guide rod 24 of the cutter assembly 12 is then inserted at least partially inside the guide passage 32 of the guide assembly 14. With the guide rod 24 inserted into at least a portion of the guide passage 32, rotational force can be applied to the cutter assembly 12, and the guide rod 24 can be further inserted into the guide passage 32 so as to cause the cutting teeth 54 to engage the fitting 28. The cutter assembly 12 is lowered until the cutting teeth pass through the fitting 28, as shown in FIG. 5.

From the above description it is clear that the present invention is well adapted to carry out the disclosed aspects, and to attain the advantages mentioned herein as well as those inherent in the invention. While presently preferred implementations of the invention have been described for purposes of disclosure, it will be understood that numerous changes may be made which readily suggest themselves to those skilled in the art and which are accomplished within the spirit of the invention disclosed.

What is claimed is:

1. An apparatus for removing a fitting from a pipe having a central axis, the apparatus comprising:
   a guide member defining a guide passage with a longitudinal axis;
   means for supporting the guide member within at least a portion of the pipe with the longitudinal axis of the guide passage of the guide member in a coaxial relationship with the central axis of the pipe,
   wherein the means for supporting the guide member comprises:
      a top member connected to the guide member;
      a bottom member positioned in a spaced apart parallel relationship to the top member, the top and bottom members being movable relative to one another along the longitudinal axis of the guide member;
      an expandable gripping member positioned between the top member and the bottom member such that the gripping member is expandable in a radially outward direction so as to grip the interior of the pipe upon moving at least one of the top member and the bottom member so as to compress the expandable gripping member between the top and bottom members; and
      at least one adjustment means adapted to move the top member and bottom member relative to one another along the longitudinal axis of the guide member, wherein the at least one adjustment means further comprises:
a fastener adapted to fasten either the top member or the bottom member to the guide member thereby defining a fixed member and a non-fixed member; and
at least one securing member positioned adjacent to the non-fixed member and adapted to move the non-fixed member towards the fixed member thereby compressing the expandable gripping member between the fixed and non-fixed members;
a rotary hole saw having a cylindrical wall provided with a plurality of cutting teeth on an open end thereof and a central axis of rotation about which the cylindrical wall and the plurality of cutting teeth are rotatable, the cylindrical wall defining a cylindrical chamber; and
a guide rod connected to the rotary hole saw such that the guide rod extends through the cylindrical chamber of the hole saw and beyond the open end thereof in coaxial alignment with the central axis of rotation of the hole saw, the guide rod being slidingly receivable in the guide passage of the guide member.

\* \* \* \* \*